(12) United States Patent
Styles (10) Patent No.: US 11,139,522 B1
(45) Date of Patent: Oct. 5, 2021

(54) BATTERY ASSEMBLY HAVING A CONCEALED POWER SOURCE AND ACCESSORIES

(71) Applicant: Brian Styles, Delray Beach, FL (US)

(72) Inventor: Brian Styles, Delray Beach, FL (US)

(*) Notice: Subject to any disclaimer, the term of this patent is extended or adjusted under 35 U.S.C. 154(b) by 236 days.

(21) Appl. No.: 16/207,135

(22) Filed: Dec. 1, 2018

Related U.S. Application Data (60) Provisional application No. 62/593,849, filed on Dec. 1, 2017.

(51) Int. Cl.
| | |
|---|---|
| *H01M 50/20* | (2021.01) |
| *H01M 10/42* | (2006.01) |
| *H01M 10/48* | (2006.01) |
| *H01M 50/543* | (2021.01) |

(52) U.S. Cl.
CPC ......... *H01M 50/20* (2021.01); *H01M 10/425* (2013.01); *H01M 10/488* (2013.01); *H01M 50/543* (2021.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 3,287,532 A | 11/1966 | Boseley | |
| 5,349,535 A * | 9/1994 | Gupta | B60L 53/65 |
| | | | 702/63 |
| 5,399,818 A | 3/1995 | Golbeack | |
| 6,788,025 B2 * | 9/2004 | Bertness | H02J 7/342 |
| | | | 320/104 |
| 8,748,030 B2 * | 6/2014 | Byun | H01M 50/578 |
| | | | 429/161 |
| 2007/0166606 A1 * | 7/2007 | Brecht | H01M 10/488 |
| | | | 429/72 |
| 2015/0079461 A1 | 3/2015 | Bird | |

* cited by examiner

*Primary Examiner* — Sarah A. Slifka
(74) *Attorney, Agent, or Firm* — Allen D Hertz, P. A.; Allen D. Hertz (57) ABSTRACT

An automotive battery assembly comprising a housing having a period correct appearance for a classic battery. The housing encloses a modern power storage configuration providing power to terminals assembled to the housing. The housing includes four sides, a top panel and a base panel, collectively defining an interior volume. The top panel can be fixed, openable, or removable. A series of water fill caps can be assembled to the top panel. One or more electrical support components can be integrated within the housing, thus being concealed from view. The electrical support components can include a battery disconnect, a charging circuit, a transformer, a fuse, a monitoring system (charging status, battery condition, etc.), a location tracking system, a booster pack, etc. Access to the electrical support components can be provided through the water fill caps or the moveable top panel.

20 Claims, 6 Drawing Sheets

BATTERY ASSEMBLY HAVING A CONCEALED POWER SOURCE AND ACCESSORIES

CROSS-REFERENCE TO RELATED APPLICATION

This application claims priority to U.S. Provisional Patent Application Ser. No. 62/593,849 filed on Dec. 1, 2017, the contents of which is fully incorporated herein by reference.

FIELD OF THE INVENTION

The present invention relates to an assembly and system for providing battery having a concealed power source and accessories within an enclosure, the enclosure resembling a common or period correct vehicle battery.

BACKGROUND OF THE INVENTION

Vehicles rely upon a battery for electrical power for starting an engine, providing power to electrically operated components, including an ignition system, a computer, sensors, a vehicle alarm, and the like. The battery is connected to a common ground, which is usually a chassis, frame, body, or the like. Vehicle batteries commonly loose power over time if they are not recharged periodically. For regularly used vehicles, this is not an issue, as an alternator or generator operated by the engine provides a charging system for recharging the battery while being driven. Conversely, vehicles which are not used regularly, such as collector vehicles, exotic vehicles, specialty vehicles and the like, require use of an external charging system to maintain a health or charge of the battery. External charging systems, such as trickle charges are connected to the battery using alligator clips. The alligator clips can accidentally become dislodged from the terminals, accidentally short against exposed metal proximate the positive alligator clip, and create other undesirable conditions.

In certain installations, a battery disconnect can be installed at the battery terminal. The quick disconnect engages and disengages connectivity between one of the battery terminals and the vehicle. The battery disconnect is normally installed at the negative terminal of the battery. The battery disconnect may be installed for any number of reasons.

In one example, the battery disconnect can be installed in a collector vehicle to maintain the health of the battery. The drawback of this installation is that the battery disconnect is installed as an aftermarket item, which may detract from an appearance of the collector vehicle. This could impact judging of the collector vehicle during a car show, and other perceptions associated with being period correct.

In another example, the battery disconnect can be installed in any vehicle to provide security against theft. The battery disconnect would be used to disconnect power while being parked or stored. The lack of power would be a deterrent from theft, when speed is an issue when stealing the vehicle. A drawback of currently available configurations is the obviousness and ease of accessibility to the battery disconnect switch. Once the hood is opened, currently available battery disconnect configurations are easily identified and resolved. In this example, it would be beneficial to provide a battery disconnect that is concealed, thus hindering any potential theft of the vehicle.

Battery charging is commonly accomplished using a transformer, which converts alternating current (AC) into direct current (DC). Transformers are commonly integrated into a housing of a battery charger. These are provided in different sizes, normally the size being based upon the amperage for charging. Trickle chargers generate a low amperage current and are usually found having small transformers. The transformer or complete battery charger is connected between the battery and an extension cord. The user can disconnect and remove the extension cord, while accidentally leaving the charger or transformer within an engine bay of the vehicle. If the transformer is accidentally left within the vehicle while the engine is started and/or running, there is a potential that the transformer can get caught in the belts, pulleys or other rotating elements of the running engine. In a scenario where the charger is not disconnected and the vehicle is moved, the connected cable and the associated charger can cause damage to the moving vehicle and/or other items located in the proximity of the vehicle.

An owner of a vehicle might desire to install other accessories in the vehicle.

Battery condition monitoring is desirable, particularly for vehicles that are not frequently driven or started. Battery condition monitors are an accessory having two leads; each lead being temporarily secured to a respective positive or negative terminal. The battery condition monitor would be disconnected and removed from the vehicle during use of the vehicle and reinstalled when the vehicle is parked for a lengthy time span.

An owner of an infrequently driven vehicle might rely upon a battery booster pack. A battery booster pack is a portable power supply having sufficient cranking amps for jumping starting the vehicle. Battery boosters are available in a variety of sizes. Recent advances in battery technology have reduced the size and weight of the battery boosters, where some battery boosters are small enough to fit within a glove box of the vehicle.

In another example, an owner might desire to install a Global Positioning System (GPS) tracking device enabling tracking of the vehicle. Due to the nature of the GPS tracking device, it would be preferred that the GPS tracking device is installed in a concealed location. It is further desired that the GPS tracking device be located close to the power source or provided with its own rechargeable power source.

Solutions for the above identified scenarios are further complicated when installing these accessories in a classic or other collector vehicle where period correct components are critical. Battery technology continues to advance. The current battery technology is significantly improved compared to the battery technology of classic vehicles. Modern batteries are limited in that they lack an appearance that would be period correct for the classic vehicles. What would be desired is a battery having an appearance that would be period correct for the classic vehicle while providing up-to-date battery technology.

For reasons described above, there is a need to invent and develop an assembly capable to concealing accessories from view. Additionally, it would be beneficial if the solution provides an appearance that would be period correct for the classic vehicles.

BRIEF SUMMARY OF THE INVENTION

The present invention overcomes the deficiencies of the known art and the problems that remain unsolved by providing an apparatus and a respective method of enabling use of modern technology while maintaining a classic appearance. The present solution additionally enables concealment of a number of accessories. This configuration enables the owner to install desired equipment without impacting the appearance of the vehicle.

In accordance with one embodiment of the present invention, the invention consists of:

An automotive battery assembly comprising:
an automotive battery including a modern power storage configuration providing power to a pair of power supply terminals;
a battery concealing enclosure replicating an appearance of a vintage battery, the battery concealing enclosure comprising an interior volume sized and shaped to receive and conceal the automotive battery;
a pair of connection terminals, each connection terminal replicating a vintage battery terminal, each connection terminal being assembled to the battery concealing enclosure;
an electrical support component;
a first power supply terminal of the pair of power supply terminals being in electrical communication with a first connection terminal of the pair of connection terminals,
a second power supply terminal of the pair of power supply terminals being in electrical communication with a second connection terminal of the pair of connection terminals,
the electrical support component being in direct or indirect electrical communication with the pair of power supply terminals;
the automotive battery and the electrical support component being concealed within the interior volume of the battery concealing enclosure.

In a second aspect of the present invention, the battery terminals of the battery concealing enclosure are assembled by potting a terminal plug within a terminal mounting cavity, the terminal plug comprising a retention element.

In another aspect of the present invention, the retention element is a retention flange.

In yet another aspect of the present invention, the battery enclosure further comprises at least one decorative fill cap replicating a water cavity access cap of a battery.

In yet another aspect of the present invention, the battery enclosure further comprises at least one openable decorative fill cap replicating a water cavity access cap of a battery.

In yet another aspect of the present invention, the battery enclosure further comprises at least one removable decorative fill cap replicating a water cavity access cap of a battery.

In yet another aspect of the present invention, the battery enclosure further comprises at least one decorative fill cap replicating a water cavity access cap of a vintage battery.

In yet another aspect of the present invention, the battery enclosure further comprises at least one (1) circular decorative fill cap replicating those of period correct appearance of a water cavity access cap of the vintage battery.

In yet another aspect of the present invention, the battery enclosure further comprises six (6) circular decorative fill caps replicating those of a period correct appearance of the vintage battery.

In yet another aspect of the present invention, the battery enclosure further comprises at least one (1) rectangular decorative fill cap replicating those of a period correct appearance of the vintage battery.

In yet another aspect of the present invention, the battery enclosure further comprises a pair of rectangular decorative fill caps replicating a period correct appearance of the vintage battery.

In yet another aspect, the electrical support component is located proximate the decorative fill cap, the decorative fill cap providing access and concealment of the electrical support component.

In yet another aspect, the electrical support component is located proximate the decorative fill cap, the decorative fill cap providing user operation of the electrical support component.

In yet another aspect, the electrical support component includes wiring and a battery charger connector for connectivity to a charging circuit, the battery charger connector being located proximate the decorative fill cap, the decorative fill cap providing access and concealment of the battery charger connector.

In yet another aspect, the charging circuit further comprises a fuse, the fuse being located in line between one of the charging conductors and one of the source battery terminals.

In yet another aspect, the fuse is located proximate one of the decorative fill caps, wherein the respective decorative fill cap provides concealment of and access to the fuse.

In yet another aspect, the fuse is partially attached to one of the decorative fill caps, wherein the respective decorative fill cap provides concealment of, access to, and replacement of the fuse.

In yet another aspect, the fuse is integrated into an interior portion of the decorative fill cap.

In yet another aspect, the fuse is in a form of a breaker switch.

In yet another aspect, the breaker switch can be operated by a motion of the respective decorative fill cap.

In yet another aspect, the charging circuit further comprises a transformer.

In yet another aspect, the transformer is concealed within the interior volume of the battery concealing enclosure.

In yet another aspect, the charging circuit further comprises a charging monitoring circuit.

In yet another aspect, the charging circuit further comprises a charging connection monitoring circuit.

In yet another aspect, the charging circuit further comprises a battery condition monitoring circuit.

In yet another aspect, the monitoring circuit is concealed within the interior volume of the battery concealing enclosure.

In yet another aspect, the monitoring circuit includes an alert.

In yet another aspect, the alert being at least one of an audible alert, a visual alert, a tactile alert, a transmitted signal, a wirelessly transmitted signal, and the like.

In yet another aspect, the charging monitoring circuit identifies when a charging cable is coupled to the charging circuit connector.

In yet another aspect, the charging monitoring circuit identifies when a charging cable is coupled to the charging circuit connector using at least one of: a mechanical sensing system, a visual sensing system, a proximity sensing system, audible sensing system, a resistance sensing system, and the like.

In yet another aspect, the charging connection monitoring circuit identifies when charging circuit is active.

In yet another aspect, the charging connection monitoring circuit controls power connectivity between the source battery terminal and the connection terminal.

The power connectivity circuitry of the charging connection monitoring circuit

In yet another aspect, the battery concealing enclosure includes an openable section, wherein the openable section enables access to the electronic support component.

In yet another aspect, the openable or access section is hingeably assembled to a base portion of the battery concealing enclosure.

In yet another aspect, the openable section is detachably assembled to a base portion of the battery concealing enclosure.

In yet another aspect, the openable or access section and the base portion of the battery concealing enclosure are slideably assembled to one another.

In yet another aspect, the openable section and the base portion of the battery concealing enclosure are mechanically assembled to one another using a mechanical fastener.

In yet another aspect, the openable section and the base portion of the battery concealing enclosure are mechanically assembled to one another using a concealed mechanical fastener, such as a snap.

In yet another aspect, the electrical support component includes a battery quick disconnect, the battery quick disconnect being integral in a circuit between power source terminal and the connecting terminal.

In yet another aspect, the battery quick disconnect includes an operating mechanism concealed within the interior volume of the battery concealing enclosure.

In yet another aspect, the electrical support component includes a battery quick disconnect, the battery quick disconnect having an operating mechanism being located proximate one decorative fill cap of the at least one decorative fill cap.

In yet another aspect, the battery quick disconnect employs the decorative fill cap as an operating mechanism for operating the battery quick disconnect.

In yet another aspect, the operating mechanism of the battery quick disconnect includes a non-circular engaging feature, wherein the non-circular engaging feature mates with a mating non-circular engaging feature of the decorative fill cap enabling the decorative fill cap to operate the battery quick disconnect.

In yet another aspect, the electrical support component includes a booster pack.

In yet another aspect, the booster pack is integrated into a circuit comprising a power connection switch. The power connection switch is integrated between the booster pack and one connection terminal of the pair of connection terminals.

In yet another aspect, the booster pack is integrated into a circuit comprising a power connection switch. The power connection switch is integrated between the booster pack and one power source terminal of the pair of power source terminals.

In yet another aspect, the booster pack is assembled within the interior cavity of the battery concealing enclosure and concealed accordingly.

In yet another aspect, the booster pack is in electrical communication with the charging circuit.

In yet another aspect, the booster pack is in electrical communication with the transformer of the charging circuit.

In yet another aspect, the electrical support component includes a location monitoring system.

In yet another aspect, the location monitoring system includes a Global Positing System (GPS) receiver.

In yet another aspect, the location monitoring system is assembled within the interior cavity of the battery concealing enclosure and concealed accordingly.

In yet another aspect, the electrical support component is serviceable.

In yet another aspect, the electrical support component is removable and replaceable.

In yet another aspect, the battery concealing enclosure is adapted for user integration and/or removal of one or more electrical support components.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PRESENT INVENTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Vehicle batteries have continued to improve over time. It is desired to maintain a period correct appearance of classic and collector vehicles. The battery shapes and sizes of the classic and collector vehicles vary and are distinctly different from modern vehicle batteries. It would be cost prohibitive to manufacture low volume batteries having a period correct appearance of classic and collector vehicles using modern battery technology. Additionally, use of electrical support components, such as a battery charger, a tracking system, and the like could cause damage to the vehicle, introduce an installed device that is not period correct, and exhibit other detracting features.

Figure 1:
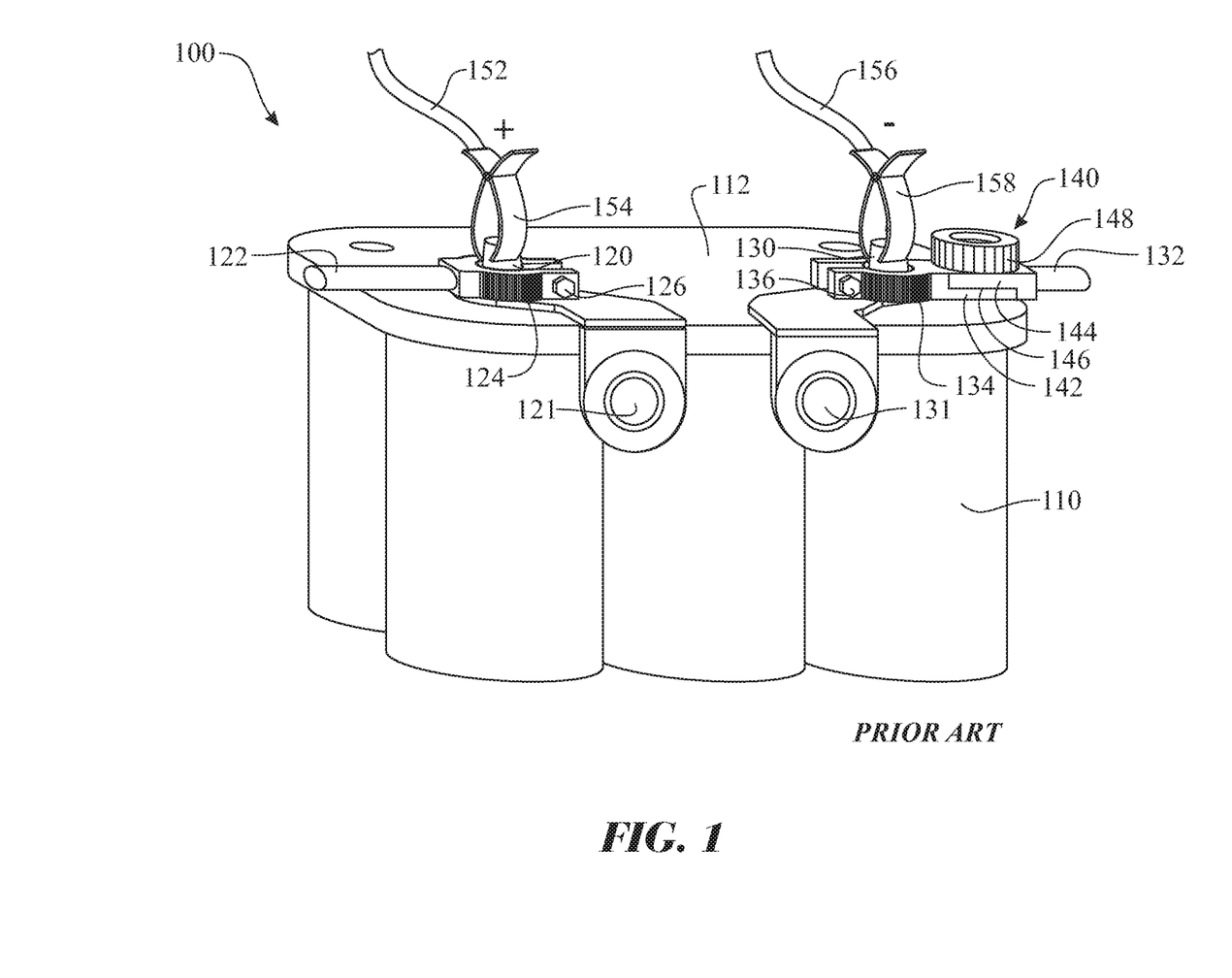
FIG. 1 presents an isometric view of an exemplary modern vehicle battery representative of a current state of the art.

A 12 volt modern vehicle battery 100, illustrated in FIG. 1, includes several examples of the detracting features used with and/or installed thereon. The 12 volt modern vehicle battery 100 includes a 12 volt modern vehicle battery housing 110, which contains power storing elements (not shown, but well understood by those skilled in the art). For example, some batteries use a lead acid combination to store and discharge electrical power. Some lead acid batteries utilize a liquid electrolyte. Other batteries utilize a gel electrolyte instead of a liquid allows the battery to be used in different positions without leakage. The power storing elements are sealed within the 12 volt modern vehicle battery housing 110 using a 12 volt modern vehicle battery housing cover 112. The 12 volt modern vehicle battery housing cover 112 is normally attached to the 12 volt modern vehicle battery housing 110 using a bonding assembly process. Although the exemplary illustrations and descriptions utilize a 12 volt modern vehicle battery, it is understood that a vehicle battery 100 of any suitable voltage can be used.

Electrical power is transferred between the stored power source and a power connection configuration. The power connection configuration includes at least one positive terminal 120, 121 and at least one negative terminal 130, 131 for connection to at least one electrically operated component.

There are several reasons why it would be desirable to disconnect the battery from the vehicle. For example, if the vehicle is not used on a regular basis, the battery would discharge over time. Disconnecting the battery from the vehicle would prolong the life of the charge of the battery. Disconnecting the battery is also a deterrent from a common thief. A disconnected battery would increase the time required to start the vehicle, which would deter a theft of the vehicle.

A battery disconnect assembly 140 can be installed between either terminal 120, 130 and a respective battery cable 122, 132. In normal practice the battery disconnect assembly 140 is installed on the negative top post terminal 130 of the 12 volt modern vehicle battery 100, as shown in FIG. 1. The exemplary battery disconnect assembly 140 includes a battery disconnect conductive terminal attachment element 142 and a battery disconnect conductive cable attachment element 144, having a battery disconnect insulation element 146 sandwiched between the battery disconnect conductive terminal attachment element 142 and the battery disconnect conductive cable attachment element 144. Electrical connection between the battery disconnect conductive terminal attachment element 142 and the battery disconnect conductive cable attachment element 144 is provided by a battery disconnect continuity controller element 148. The battery disconnect conductive terminal attachment element 142 would be integrated into a first battery clamp 124, 134. The first battery clamp 124, 134 would be secured to the respective terminal 120, 130 using a clamp fastener 126, 136. The battery disconnect conductive cable attachment element 144 would be connected to the vehicle by a respective battery cable 122, 132. A similar second battery clamp 134, 124 would be secured to the other respective terminal 130, 120 using a similar clamp fastener 136, 126. The second battery clamp 134, 124 would be directly connected to the vehicle by a respective battery cable 132, 122.

The battery disconnect continuity controller element 148 includes a threaded conductive shaft that threadably engages with a mating threaded holed formed through the battery disconnect conductive terminal attachment element 142. The battery disconnect continuity controller element 148 also includes a conductive flange located at a top portion of the threaded conductive shaft that is configured to engage with the battery disconnect conductive cable attachment element 144. When the battery disconnect continuity controller element 148 is rotated into a position where the conductive flange contacts the mating surface of the battery disconnect conductive cable attachment element 144, the threaded conductive shaft and the conductive flange complete a conductive circuit between the battery disconnect conductive terminal attachment element 142 and the battery disconnect conductive cable attachment element 144, enable use of the 12 volt modern vehicle battery 100. When the battery disconnect continuity controller element 148 is rotated into a position where the conductive flange is separated from the mating surface of the battery disconnect conductive cable attachment element 144, the conductive circuit between the battery disconnect conductive terminal attachment element 142 and the battery disconnect conductive cable attachment element 144 is opened, disabling use of the 12 volt modern vehicle battery 100. The described configuration of the battery disconnect assembly 140 is only one example of any suitable configuration that can be utilized as the battery disconnect assembly 140.

A battery charger, exemplified by a pair of charging conductors, would include a battery charger cable (positive) 152 and a battery charger cable (negative) 156, which are connected to the respective terminals 130, 130 by a battery charger clip (positive) 154 and a battery charger clip (negative) 158. The battery charger clips 154, 158 are normally provided as alligator clips, which can be easily engaged with and disengaged from the respective terminals 120, 130. The battery charger can be a standard battery charger, a trickle charger, a booster pack, or any other device providing the same function. This solution is removable, which retains the period correct appearance of the vehicle. The concern is when starting and moving a vehicle while accidentally forgetting to disconnect and remove the battery charger. The connected cables and charger could damage the vehicle when the vehicle is moved when the charger cables remain connected to the battery. The smaller the charger, such as a trickle charger, the more likely the vehicle will be moved without disconnecting and removing the charger.

Figure 2:
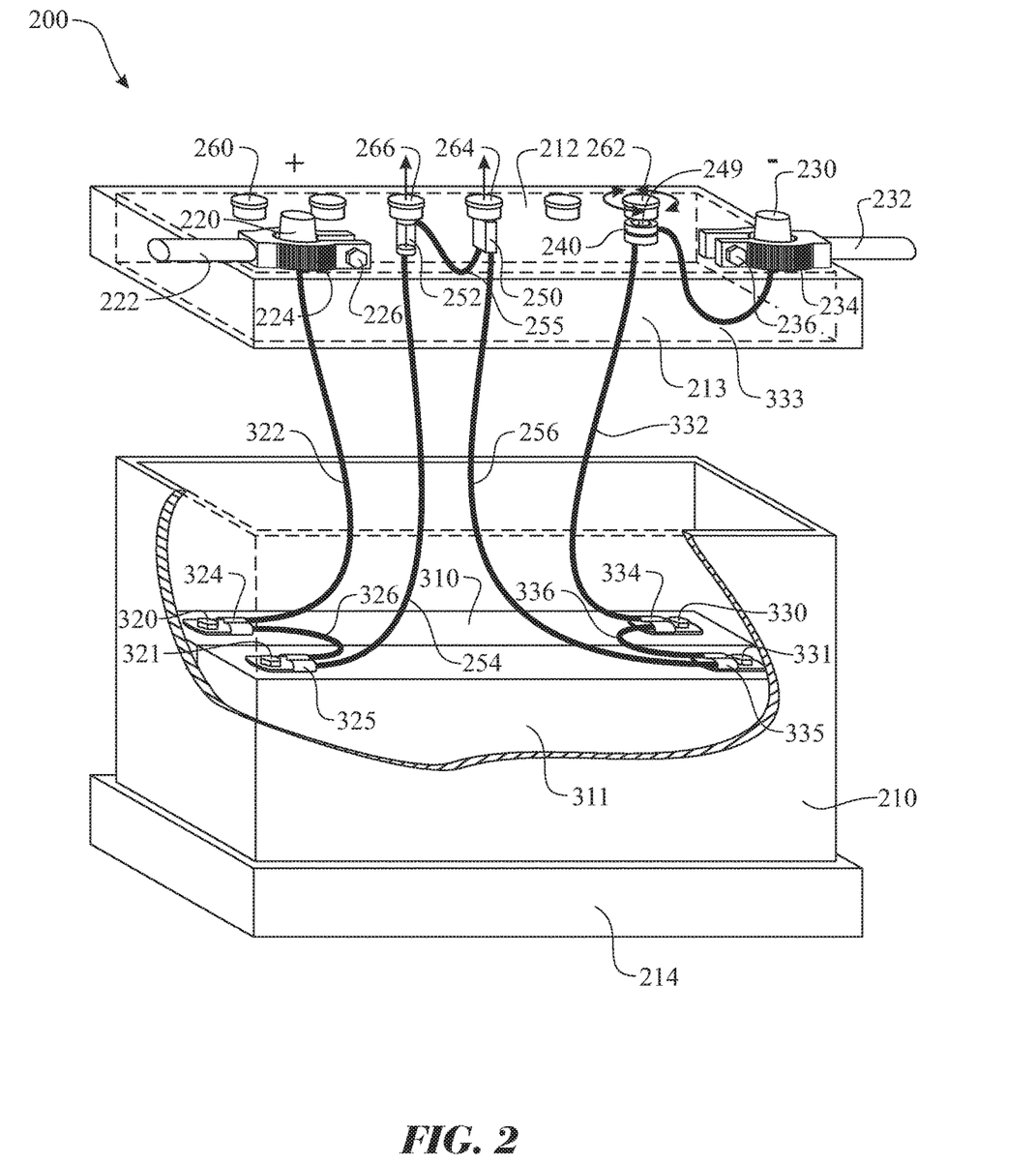
FIG. 2 presents an isometric view of a first exemplary configuration of an accessory concealing vehicle battery assembly, a cover of a battery concealing housing being separated from a battery concealing housing, the housing being shown having a partial cutaway.

An accessory concealing vehicle battery assembly 200, as illustrated in a partially exploded assembly view shown in FIG. 2, presents one exemplary solution to the above described issues. The basic elements of the accessory concealing vehicle battery assembly 200 mimic those of the 12 volt modern vehicle battery 100. Like elements of the accessory concealing vehicle battery assembly 200 and the 12 volt modern vehicle battery 100 are numbered the same, preceded by the numeral "2". Initially, modern battery technology is concealed within an interior of an enclosure 210, 212, 213, 214 having a period correct appearance. The enclosure includes an accessory concealing vehicle battery concealing housing 210, which can include a 214. The accessory concealing vehicle battery concealing housing 210 comprises a base (not shown, but well understood) and four (4) sidewalls extending upward from a peripheral edge of the base, collectively defining an interior volume. An enclosure top sealing element, such as an accessory concealing vehicle battery cover top panel 212 and an accessory concealing vehicle battery housing cover sidewall 213, would be assembled to an opened end of the accessory concealing vehicle battery concealing housing 210. The enclosure top sealing element can be provided in any suitable design, and assembled to the accessory concealing vehicle battery concealing housing 210 using any suitable assembly technique and/or configuration. In the exemplary embodiment, the enclosure top sealing element comprises an accessory concealing vehicle battery housing cover sidewall 213 extending downward from a peripheral edge of the 12 volt modern vehicle battery housing cover 112. The accessory concealing vehicle battery housing cover sidewall 213 is sized and shaped to mate with the outer surface of the upper portion of the accessory concealing vehicle battery concealing housing 210. The enclosure top sealing element can be permanently assembled to the accessory concealing vehicle battery concealing housing 210 using a bonding agent, such as adhesive, epoxy, and the like, ultrasonic welding, thermal welding, or any other permanent bonding process. Alternatively, the enclosure top sealing element can be openly and/or removably assembled to the accessory concealing vehicle battery concealing housing 210. To complete the period correct appearance, a series of battery cover water fill caps 260 can be fabricated and assembled to the accessory concealing vehicle battery cover top panel 212. For use, it is desirable that at least a portion of the battery cover water fill cap 260 are removably assembled to the accessory concealing vehicle battery cover top panel 212. The battery cover water fill cap 260 can be of any shape and size replicating the period correct appearance of the respective battery.

One or more source batteries 310, 311 would be inserted within the interior volume of the accessory concealing vehicle battery concealing housing 210. In the exemplary illustration presented in FIG. 2, the accessory concealing vehicle battery assembly 200 includes a first 12 volt source battery 310 and a second 12 volt source battery 311. The pair of source batteries 310, 311 can be connected in parallel (as shown) or in series, wherein the connection configuration would be respective to the voltage of the source batteries 310, 311. In the exemplary illustration, the first 12 volt source battery 310 is connected to the post terminals 220, 230 using cabling 322, 33, 333. A first 12 volt source battery positive terminal 320 of the first 12 volt source battery 310 is connected to the positive top post terminal 220 by the source battery to positive battery output terminal cable 322. A first end of the source battery to positive battery output terminal cable 322 is coupled to the first 12 volt source battery positive terminal 320 by a first 12 volt positive source battery source cable connector 324. A second end of the source battery to positive battery output terminal cable 322 is coupled to the positive top post terminal 220 using any suitable electro-mechanical connection method.

A first 12 volt source battery negative terminal 330 of the first 12 volt source battery 310 is connected to the negative top post terminal 230 by a combination of the source battery to battery disconnect switch cable 332, a battery disconnect assembly 240 and the battery disconnect switch to negative battery output terminal cable 333. A first end of the source battery to battery disconnect switch cable 332 is coupled to the first 12 volt source battery negative terminal 330 by a first 12 volt negative source battery source cable connector 334. A second end of the source battery to battery disconnect switch cable 332 is coupled to the battery disconnect assembly 240 using any suitable electro-mechanical connection method. A battery disconnect switch to negative battery output terminal cable 333 provide electrical connectivity between the opposite side of the battery disconnect assembly 240 and the negative top post terminal 230. Connections of the battery disconnect switch to negative battery output terminal cable 333 to the respective element would be provided using any suitable electro-mechanical connection method.

The second 12 volt source battery 311 is connected in parallel to the first 12 volt source battery 310 using a pair of battery coupling cables 326, 336. The first 12 volt source and second 12 volt source positive terminal coupling cable 326 is coupled between positive terminals 320, 321 of the batteries 310, 311 using connectors 324, 325. Similarly, the first 12 volt source and second 12 volt source negative terminal coupling cable 336 is coupled between negative terminals 330, 331 of the batteries 310, 311 using connectors 334, 335.

Design and functionality of the battery disconnect assembly 240 would be provided by the designer. As shown in the exemplary illustration, the battery disconnect assembly 240 can be accessed to through a battery disconnect switch access cap 262, wherein the battery disconnect switch access cap 262 would be one of the series of battery cover water fill caps 260. In the exemplary illustration, the battery disconnect assembly 240 includes a non-circular shaped feature, such as a battery disconnect continuity controller element grip 249, shown as a hexagonal cavity. The battery disconnect switch access cap 262 could include a mating non-circular shaped feature, such as an Allen wrench, designed to engage with the battery disconnect continuity controller element grip 249, enabling use of the battery disconnect switch access cap 262 to operate the battery disconnect assembly 240.

Although the battery disconnect assembly 240 is inserted between the negative terminals 230, 231 of the source batteries 310, 311 and the negative top post terminal 230, it is understood that the battery disconnect assembly 240 can be inserted between the positive terminals 220, 221 of the source batteries 310, 311 and the positive top post terminal 220.

A charging circuit can be integrated into the accessory concealing vehicle battery assembly 200. The exemplary charging circuit includes a battery charger connector 250, wherein the battery charger connector 250 provides a connection point for connecting a charger to the accessory concealing vehicle battery assembly 200. The battery charger connector 250 is located proximate an opening concealed by a battery charger connector access cap 264, wherein the battery charger connector access cap 264 is one of the series of battery cover water fill caps 260. The battery charger connector 250 can be of any suitable form factor, including a pin and socket connection, a blade and receptacle connection, a magnetic based connector coupling, and the like. The charging circuit can additionally include a battery charger fuse 252. The battery charger fuse 252 would be inserted into the circuit at an appropriate location to protect the battery and other elements. The battery charger fuse 252 would be any fuse, including but not limited to a barrel fuse, a blade fuse, or any other fuse suitable for the application. The battery charger fuse 252 would be located proximate one of the battery cover water fill cap 260 of the series of battery cover water fill caps 260. Access to the battery charger fuse 252 for inspection, servicing and replacement is provide through a battery charger fuse access cap 266, wherein battery charger fuse access cap 266 is one of the series of battery cover water fill caps 260. In the exemplary illustration, the charging circuit connects the battery charger connector 250 to the second 12 volt source battery 311. This configuration enables the user to disconnect the source batteries 310, 311 from the vehicle electrical system while charging the source batteries 310, 311. A battery charger connector to negative terminal cable 256 would connect the negative charging element to the negative terminals 331, 330 of the source batteries 311, 310. Similarly, battery charger connector to charging fuse cable 255 in combination with a battery charger connector to positive terminal cable 254 and the battery charger fuse 252 would connect the positive charging element to the positive terminals 321, 320 of the source batteries 311, 310.

When assembled, the accessory concealing vehicle battery assembly 200 would be installed into a vehicle in the same manner as the original battery. The function of the more modern source battery technology and the integrated electrical features enhances the overall functions and capabilities of the accessory concealing vehicle battery assembly 200 over the 12 volt modern vehicle battery 100.

In use, the user would access and/or operate the battery disconnect assembly 240 using the battery disconnect switch access cap 262 to toggle between a connected or disconnected state of the battery. For charging, the user would remove the battery charger connector access cap 264, exposing the battery charger connector 250. The user would then connect a mating connector from a battery charger to the battery charger connector 250. The connection is preferably a quick disconnect, such as a magnetic connection, enabling a quick separation between the cable and the battery charger connector 250 should the vehicle be moved without disconnecting and removing the charger from the accessory concealing vehicle battery assembly 200. The connection scheme between the charger and the battery charger connector 250 would provide connectors that would inhibit shorting between the charger connector and the conductive components of the vehicle.

Should an electrical issue occur, blowing the battery charger fuse 252, the user can inspect and service the battery charger fuse 252 by removing the battery charger fuse access cap 266 from the accessory concealing vehicle battery cover top panel 212. Upon completion of inspecting and servicing of the battery charger fuse 252 the user would reinstall the battery charger fuse access cap 266 on the accessory concealing vehicle battery cover top panel 212.

The accessory concealing vehicle battery assembly 200 includes a cover 212, 213 that is adapted for permanent assembly to the accessory concealing vehicle battery concealing housing 210 and employs several of the series of battery cover water fill caps 260 to provide access to and/or operation of the various electrical components within the accessory concealing vehicle battery assembly 200.

Figure 3:
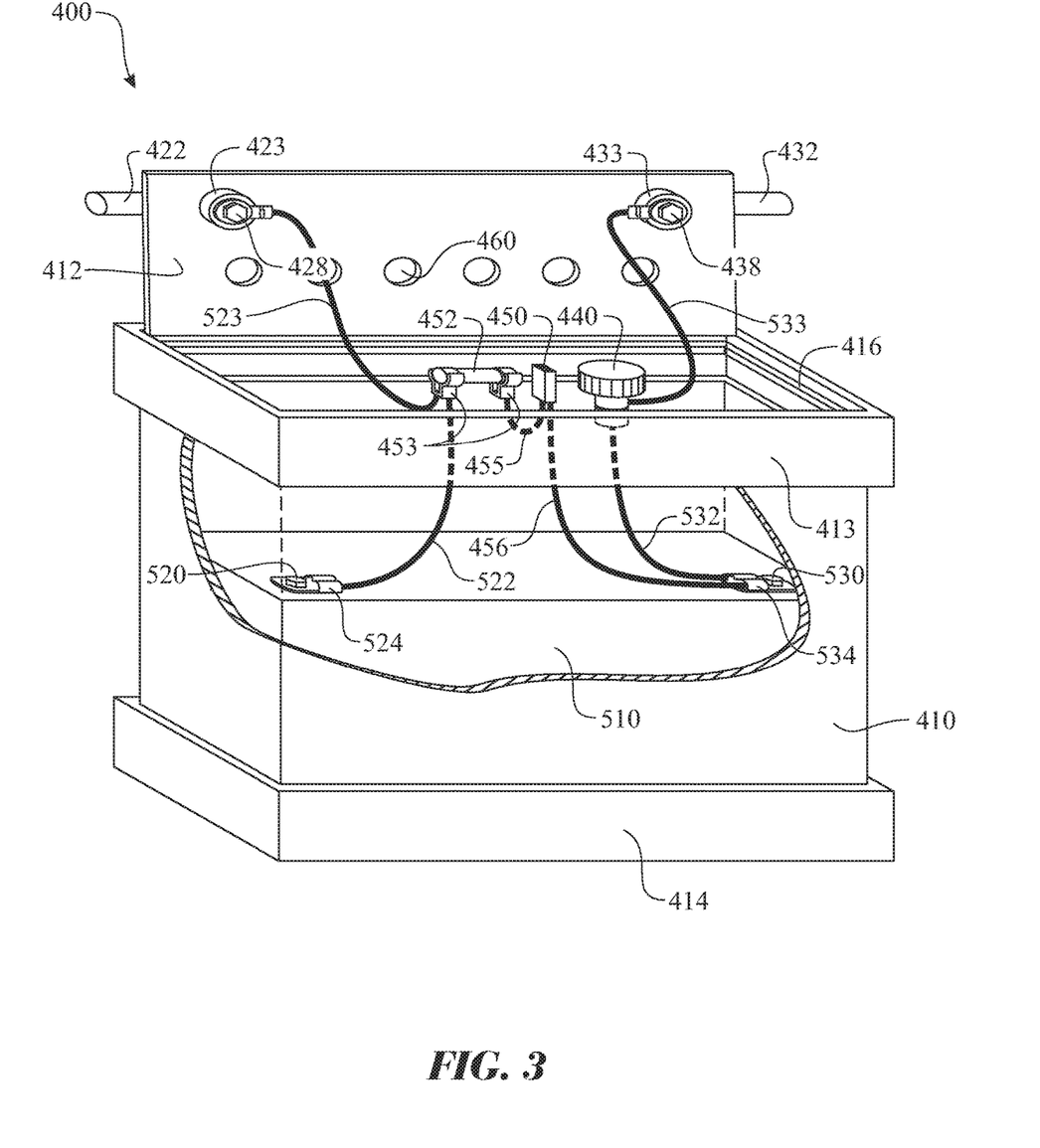
FIG. 3 presents an isometric view of a variant of the exemplary configuration of the accessory concealing vehicle battery assembly illustrated in FIG. 2, wherein the battery concealing housing cover is pivotally assembled to the battery concealing housing, the housing being shown having a partial cutaway.

An accessory concealing vehicle battery 400, illustrated in FIG. 3, includes an opening accessory concealing vehicle battery cover top panel 412, wherein the opening accessory concealing vehicle battery cover top panel 412 provides access to and/or operation of the various electrical components within the accessory concealing vehicle battery 400. The general concept of the accessory concealing vehicle battery 400 mimics that of the accessory concealing vehicle battery assembly 200. Like elements of the accessory concealing vehicle battery 400 and the accessory concealing vehicle battery assembly 200 are numbered the same, except being preceded by the numeral "4". Similarly, like elements of the power sourcing portion of the accessory concealing vehicle battery assembly 200 (preceded by the numeral "3") are numbered the same, except being preceded by the numeral "5".

Initially, the accessory concealing vehicle battery 400 includes a single source battery 510 compared to the accessory concealing vehicle battery assembly 200, which includes a pair of source batteries 310, 311. The accessory concealing vehicle battery cover top panel 412 is pivotally assembled to an accessory concealing vehicle battery top panel support feature 413 of the accessory concealing vehicle battery housing 410. The accessory concealing vehicle battery top panel support feature 413 circumscribes an opening of the accessory concealing vehicle battery housing 410. An accessory concealing vehicle battery cover top panel seating flange 416 is formed about an interior surface of the accessory concealing vehicle battery top panel support feature 413. The accessory concealing vehicle battery 400 is designed to have the peripheral edge of the accessory concealing vehicle battery cover top panel 412 seats upon a mating surface of the accessory concealing vehicle battery cover top panel seating flange 416. Each battery cover water fill cap 460 of the series of battery cover water fill caps 460 can be permanently assembled or removably assembled to the accessory concealing vehicle battery cover top panel 412. Each top post terminal includes a respective plug 423, 433, wherein each plug 423, 433 extends through the accessory concealing vehicle battery cover top panel 412. A power source cable is attached to each respective plug 423, 433.

In the exemplary illustration shown in FIG. 3, a battery charger connector to positive terminal cable 522 provides electrical continuity between the positive source terminal 520 and one battery charger fuse contact 453, wherein the one battery charger fuse contact 453 is provided to support a respective first contact of a battery charger fuse 452. A 12 volt positive source battery source cable connector 524 is used to connect the battery charger connector to positive terminal cable 522 to the 12 volt source battery positive terminal 520 of the single 12 volt source battery 510. A 12 volt source battery to positive battery output terminal cable 523 provides electrical continuity between the one battery charger fuse contact 453 and the 12 volt source battery to positive battery output terminal cable 523. A battery positive terminal plug connector 428 is used to connect the 12 volt source battery to positive battery output terminal cable 523 to the battery positive terminal plug 423. In an alternative routing, the 12 volt source battery to positive battery output terminal cable 523 can provide electrical continuity directly between the 12 volt source battery positive terminal 520 and the battery positive terminal plug 423.

A 12 volt source battery to battery disconnect switch cable 532 provides electrical continuity between the negative source terminal 530 and one contact of the battery disconnect assembly 440. A 12 volt negative source battery source cable connector 534 is used to connect the 12 volt source battery to battery disconnect switch cable 532 to the 12 volt source battery negative terminal 530 of the single 12 volt source battery 510. A battery disconnect switch to negative battery output terminal cable 533 provides electrical continuity between a second contact of the battery disconnect assembly 440 and the battery negative terminal plug 433. A battery negative terminal plug connector 438 is used to connect the battery disconnect switch to negative battery output terminal cable 533 to the battery negative terminal plug 433.

Electrical connectivity for a charging circuit is provided between one contact of a battery charger connector 450 and the 12 volt source battery negative terminal 530 by a battery charger connector to negative terminal cable 456. The 12 volt negative source battery source cable connector 534 is used to connect the battery charger connector to negative terminal cable 456 to the 12 volt source battery negative terminal 530 of the single 12 volt source battery 510. The second contact of the battery charger connector 450 is electrically connected to a second battery charger fuse contact 453 by a battery charger connector to charging fuse cable 455, wherein the second battery charger fuse contact 453 is provided to support a respective second contact of a battery charger fuse 452. The battery charger fuse 452 provides electrical continuity between the first battery charger fuse contact 453 and the second battery charger fuse contact 453.

In an alternative routing, the battery disconnect switch to negative battery output terminal cable 533 can provide electrical continuity between the same contact of the battery charger connector 450 as the battery charger connector to negative terminal cable 456 and the battery negative terminal plug 433.

A panel or any other feature can be included within the accessory concealing vehicle battery housing 410 to support the electrical components 440, 450, 453, and any other electrical components concealed within the interior volume of the accessory concealing vehicle battery housing 410.

In use, the user would rotate the accessory concealing vehicle battery cover top panel 412 about a hinge mechanism (not shown) to access the electrical components contained within the volume interior of the accessory concealing vehicle battery housing 410. The accessory concealing vehicle battery 400 can include a feature to retain the accessory concealing vehicle battery cover top panel 412 in a closed and/or open position.

Figure 4:
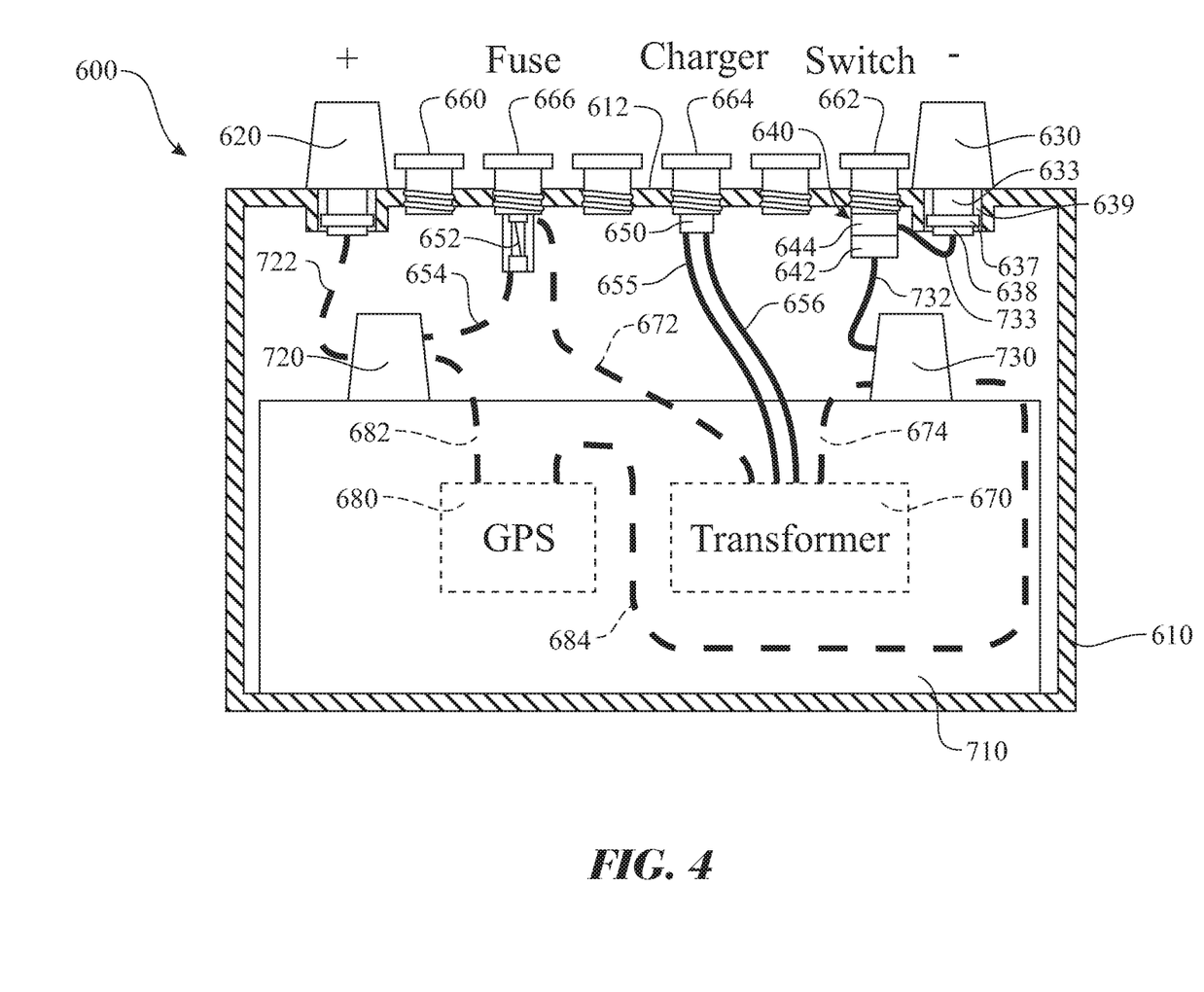
FIG. 4 presents a sectioned side elevation view of another variant of the exemplary configuration of the accessory concealing vehicle battery assembly illustrated in FIG. 2, the variant introducing a locating tracking device and a charging transformer.

The charging circuit can include a battery charger transformer 670, as shown in the exemplary accessory concealing vehicle battery 600 illustrated in FIG. 4. The accessory concealing vehicle battery 600 is similar to the accessory concealing vehicle battery assembly 200. Like elements of the accessory concealing vehicle battery 600 and the accessory concealing vehicle battery assembly 200 are numbered the same, except being preceded by the numeral "6". Similarly, like elements of the power sourcing portion of the accessory concealing vehicle battery assembly 200 (preceded by the numeral "3") are numbered the same, except being preceded by the numeral "7".

The distinction between the accessory concealing vehicle battery assembly 200 and the accessory concealing vehicle battery 600 is the introduction of a battery charger transformer 670 and a Global Positioning System (GPS) tracking device 680. To accommodate the introduction of the battery charger transformer 670, a first battery charger connector to transformer cable 655 is routed from one contact of the battery charger connector 650 to a respective power supply contact of the battery charger transformer 670. Similarly, a second battery charger connector to transformer cable 656 is routed from a second contact of the battery charger connector 650 to a respective second power supply contact of the battery charger transformer 670. A negative output from the battery charger transformer 670 and a 12 volt source battery negative terminal 730 of a 12 volt source battery 710 are electrically connected to one another by a battery charger transformer negative power output cable 674. A positive output from the battery charger transformer 670 and a 12 volt source battery positive terminal 720 of a 12 volt source battery 710 are electrically connected to one another by a combination of a battery charger transformer positive power output cable 672 and a battery charger connector to positive terminal cable 654, with a battery charger fuse 652 inserted between the battery charger transformer positive power output cable 672 and the battery charger connector to positive terminal cable 654.

Power is provided to the Global Positioning System (GPS) tracking device 680 by a Global Positioning System (GPS) positive power supply cable 682 and a Global Positioning System (GPS) negative power supply cable 684. The Global Positioning System (GPS) positive power supply cable 682 connects a first (positive) power input contact of the Global Positioning System (GPS) tracking device 680 to the 12 volt source battery positive terminal 720. The Global Positioning System (GPS) negative power supply cable 684 connects a second (negative) power input contact of the Global Positioning System (GPS) tracking device 680 to the 12 volt source battery negative terminal 730. A fuse can be inserted within one of the two power sourcing or supply cables 682, 684. The Global Positioning System (GPS) tracking device 680 is preferably configured to emit a wireless signal to provide information to a recipient. This would avoid any unwanted exposed wires, which would impact the authentic appearance of the accessory concealing vehicle battery 600. An antenna (not shown, but well understood by those skilled in the art) for the Global Positioning System (GPS) tracking device 680 can be integrated into one of a series of battery cover water fill caps 660.

The illustration introduces details of an assembly of each post terminal 620, 630. Using the accessory concealing vehicle battery negative output terminal 630 as an example, a battery negative terminal plug 633 extends downward from the accessory concealing vehicle battery negative output terminal 630. A battery terminal plug retention flange 637 is formed on the battery negative terminal plug 633. Although the battery terminal plug retention flange 637 is shown and described as a flange, it is understood that the battery terminal plug retention flange 637 can be any suitable shape to retain the battery negative terminal plug 633 within a terminal assembly cavity formed within the accessory concealing vehicle battery cover top panel 612. The battery negative terminal plug 633 is inserted through an aperture formed through the accessory concealing vehicle battery cover top panel 612, seating a lower edge of the accessory concealing vehicle battery negative output terminal 630 upon a top surface of the accessory concealing vehicle battery cover top panel 612. The battery terminal plug retention flange 637 would be located within the terminal assembly cavity. A battery terminal plug retention cavity potting material 639 is flowed into the terminal assembly cavity, curing around the battery negative terminal plug 633 and the battery terminal plug retention flange 637. When cured, the battery terminal plug retention cavity potting material 639 retains the battery negative terminal plug 633 in place, thus assembling the accessory concealing vehicle battery negative output terminal 630 to the accessory concealing vehicle battery cover top panel 612.

Although the disclosure described one assembly method and configuration for assembling each terminal post 620, 630 to the accessory concealing vehicle battery cover top panel 612, it is understood that any suitable assembly method for assembling each terminal post 620, 630 to the accessory concealing vehicle battery cover top panel 612, can be used.

The illustration introduces details of a battery disconnect assembly 640. The battery disconnect assembly 640 operates by providing continuity and disconnecting continuity between a battery disconnect assembly power source element 642 and a battery disconnect assembly power output element 644. A 12 volt source battery to battery disconnect switch cable 732 is routed between a 12 volt source battery negative terminal 730 of the 12 volt source battery 710 and the battery disconnect assembly power source element 642 of the battery disconnect assembly 640. A battery disconnect switch to negative battery output terminal cable 733 is routed between the battery disconnect assembly power output element 644 of the battery disconnect assembly 640 and a battery negative terminal plug 633 of the accessory concealing vehicle battery negative output terminal 630. The battery disconnect switch to negative battery output terminal cable 733 is connected to the battery negative terminal plug 633 by a battery negative terminal plug connector 638.

Figure 5:
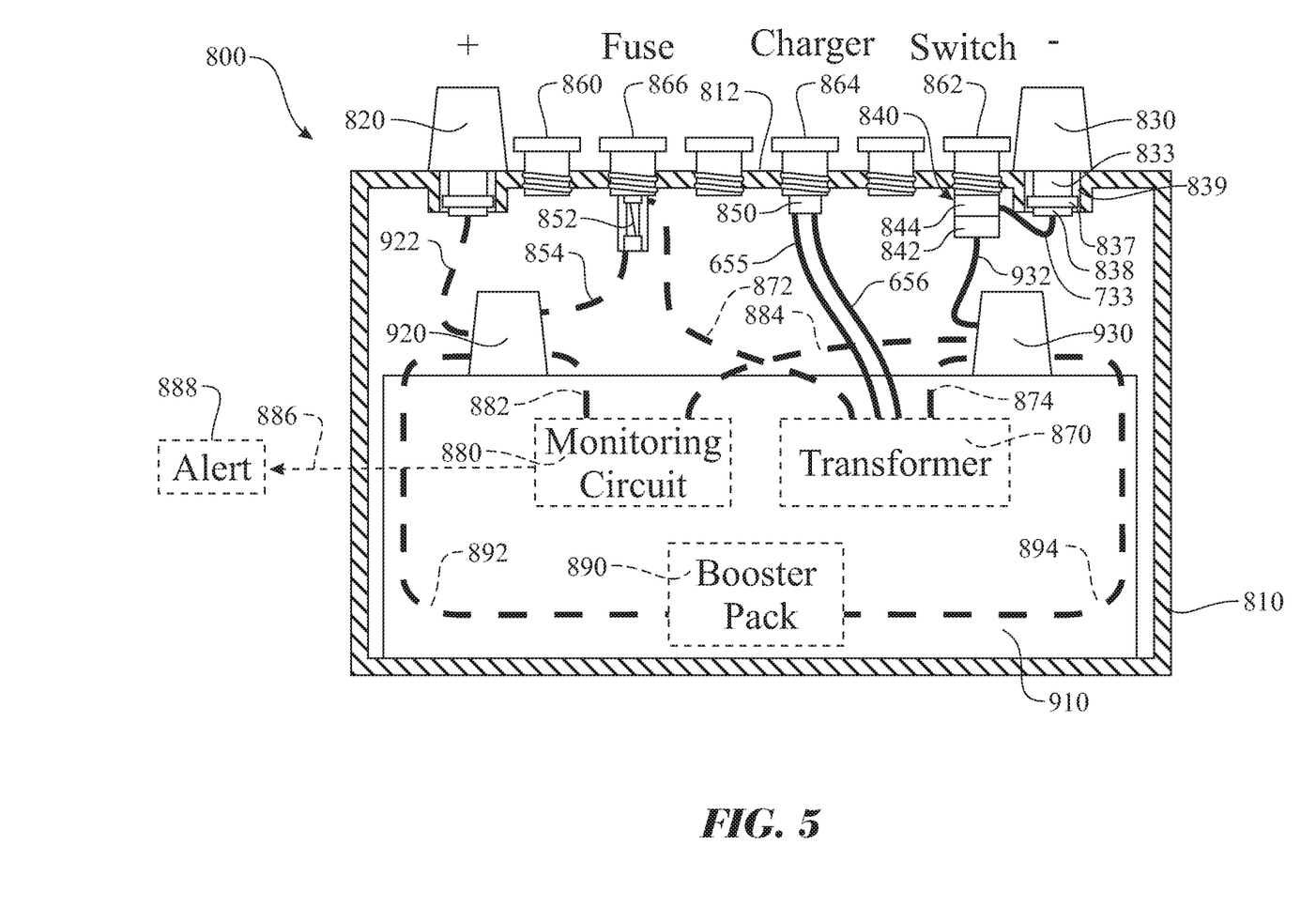
FIG. 5 presents a sectioned side elevation view of another variant of the exemplary configuration of the accessory concealing vehicle battery assembly illustrated in FIG. 2, the variant introducing a monitoring circuit and a booster pack.

Additional enhancements, such as a monitoring system 880 and a booster pack 890 can be integrated into an accessory concealing vehicle battery 800, as shown in the exemplary accessory concealing vehicle battery 800 illustrated in FIG. 5. The accessory concealing vehicle battery 800 is similar to the accessory concealing vehicle battery 600. Like elements of the accessory concealing vehicle battery 800 and the accessory concealing vehicle battery 600 are numbered the same, except being preceded by the numeral "8". Similarly, like elements of the power sourcing portion of the accessory concealing vehicle battery 600 (preceded by the numeral "7") are numbered the same, except being preceded by the numeral "9".

The distinction between the accessory concealing vehicle battery 800 and the accessory concealing vehicle battery 600 is the introduction of a monitoring system 880 and a booster pack 890.

To accommodate the introduction of the monitoring system 880, a monitoring system positive input cable 882 is routed from a 12 volt source battery positive terminal 920 of a 12 volt source battery 910 to a positive input of the monitoring system 880 and a monitoring system negative input cable 884 is routed from a 12 volt source battery negative terminal 930 of the 12 volt source battery 910 to a negative input of the monitoring system 880. A monitoring signal can be output using a wireless transmission or a monitoring system output signal cable 886. The output signal would be transmitted to monitoring system alert device 888. The monitoring system alert device 888 can emit at least one of a visual alert, an audible alert, a tactile alert, an alert to a remote party, a transmitted signal, a wirelessly transmitted signal, and the like.

To accommodate the introduction of the booster pack 890, a booster pack to source battery positive terminal cable 892 is routed from the 12 volt source battery positive terminal 920 of the 12 volt source battery 910 to a positive output of the booster pack 890 and a booster pack to source battery negative terminal cable 894 is routed from the 12 volt source battery negative terminal 930 of the 12 volt source battery 910 to a negative output of the booster pack 890. The booster pack 890 can include an internal switch and would be activated by a large current draw.

The accessory concealing vehicle battery 800 is configured having one exemplary wiring, where the booster pack 890 is wired directly to the source battery terminals 920, 930.

Figure 6:
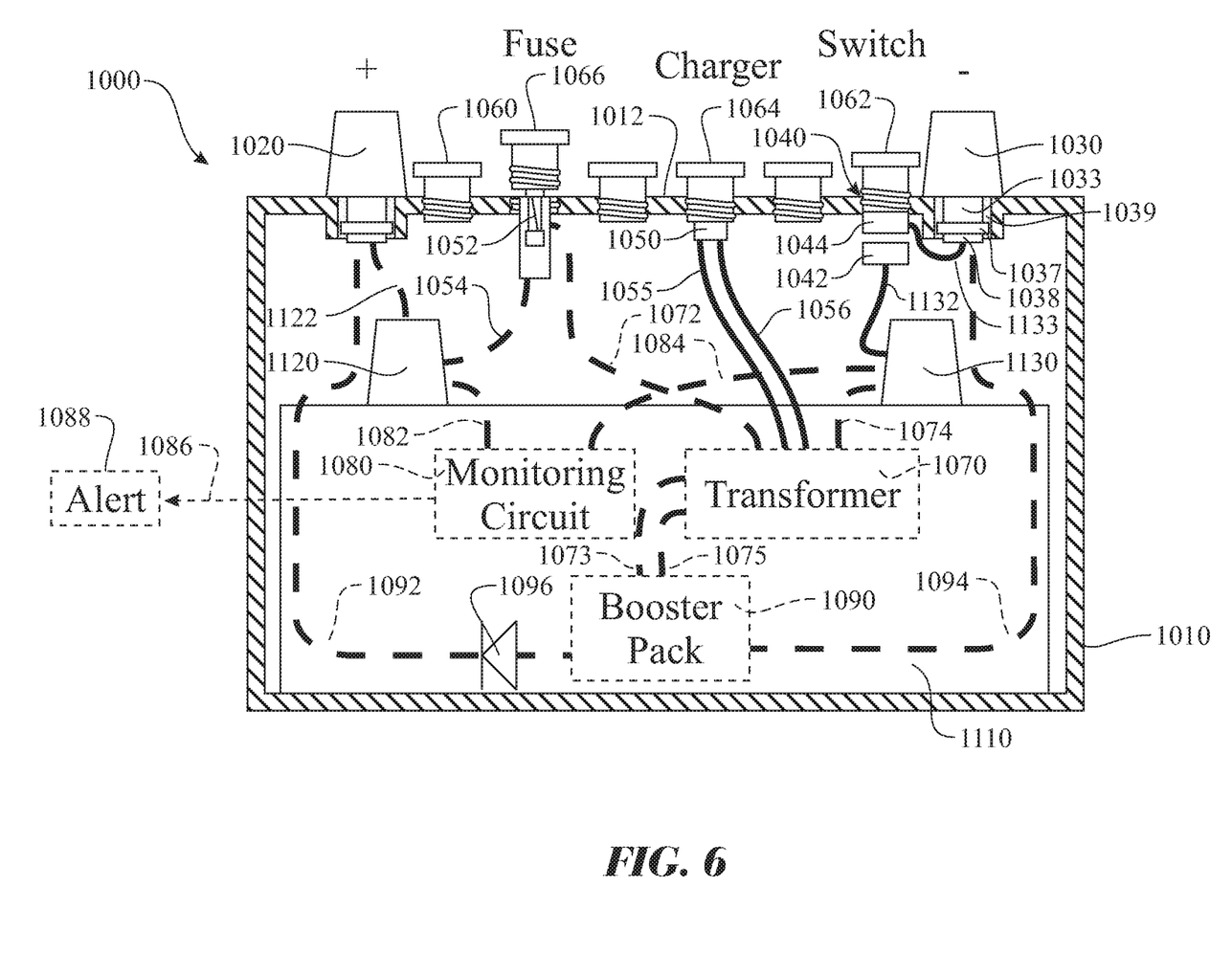
FIG. 6 presents a sectioned side elevation view of a modified configuration of the accessory concealing vehicle battery assembly illustrated in FIG. 5; the modified configuration includes an alternative wiring and functionality.

An accessory concealing vehicle battery 1000 is an enhanced variant of the accessory concealing vehicle battery 800, wherein the accessory concealing vehicle battery 1000 is illustrated in FIG. 6. The accessory concealing vehicle battery 1000 is similar to the accessory concealing vehicle battery 800. Like elements of the accessory concealing vehicle battery 1000 and the accessory concealing vehicle battery 800 are numbered the same, except being preceded by the numeral "10". Similarly, like elements of the power sourcing portion of the accessory concealing vehicle battery 800 (preceded by the numeral "9") are numbered the same, except being preceded by the numeral "11".

The distinction between the accessory concealing vehicle battery 1000 and the accessory concealing vehicle battery 800 is the alternative charging configuration for recharging a booster pack 1090. Recharging power is provided to the booster pack 1090 from a battery charger transformer 1070 by a pair of charging cables 1073, 1075. A booster pack diode 1096 or other current direction governing device would be inserted between an output contact of the booster pack 1090 and one or both of the source terminals 1120, 1130. The booster pack diode 1096 would ensure that the charging is provided by the battery charger transformer 1070.

Although the batteries are identified as 12 Volt batteries, it is understood that 6 Volt batteries may be used for 6 volt applications. The configuration may also be adapted for 24 volt systems or any other suitable power requirement.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

REFERENCE ELEMENTS

Ref. No. Description
100 12 volt modern vehicle battery
110 12 volt modern vehicle battery housing
112 12 volt modern vehicle battery housing cover
120 positive top post terminal 121 positive side terminal
122 positive battery cable
124 positive battery cable clamp
126 positive battery cable clamp fastener
130 negative top post terminal
131 negative side terminal
132 negative battery cable
134 negative battery cable clamp
136 negative battery cable clamp fastener
140 battery disconnect assembly
142 battery disconnect conductive terminal attachment element
144 battery disconnect conductive cable attachment element
146 battery disconnect insulation element
148 battery disconnect continuity controller element
152 battery charger cable (positive)
154 battery charger clip (positive)
156 battery charger cable (negative)
158 battery charger clip (negative)
200 accessory concealing vehicle battery assembly
210 accessory concealing vehicle battery concealing housing
212 accessory concealing vehicle battery cover top panel
213 accessory concealing vehicle battery housing cover sidewall
220 positive top post terminal
222 positive battery cable
224 positive battery cable clamp
226 positive battery cable clamp fastener
230 negative top post terminal
232 negative battery cable
234 negative battery cable clamp
236 negative battery cable clamp fastener
240 battery disconnect assembly
249 battery disconnect continuity controller element grip
250 battery charger connector
252 battery charger fuse
254 battery charger connector to positive terminal cable
255 battery charger connector to charging fuse cable
256 battery charger connector to negative terminal cable
260 battery cover water fill cap
262 battery disconnect switch access cap
264 battery charger connector access cap
266 battery charger fuse access cap
310 first 12 volt source battery
311 second 12 volt source battery
320 first 12 volt source battery positive terminal
321 second 12 volt source battery positive terminal
322 source battery to positive battery output terminal cable
324 first 12 volt positive source battery source cable connector
325 second 12 volt positive source battery source cable connector
326 first 12 volt source and second 12 volt source positive terminal coupling cable
330 first 12 volt source battery negative terminal
331 second 12 volt source battery negative terminal
332 source battery to battery disconnect switch cable
333 battery disconnect switch to negative battery output terminal cable
334 first 12 volt negative source battery source cable connector
335 second 12 volt negative source battery source cable connector
336 first 12 volt source and second 12 volt source negative terminal coupling cable
400 accessory concealing vehicle battery
410 accessory concealing vehicle battery housing
412 accessory concealing vehicle battery cover top panel
413 accessory concealing vehicle battery top panel support feature
414 accessory concealing vehicle battery base support feature
416 accessory concealing vehicle battery cover top panel seating flange
422 positive battery cable
423 battery positive terminal plug
428 battery positive terminal plug connector
432 negative battery cable
433 battery negative terminal plug
438 battery negative terminal plug connector
440 battery disconnect assembly
450 battery charger connector
452 battery charger fuse
453 battery charger fuse contact
455 battery charger connector to charging fuse cable
456 battery charger connector to negative terminal cable
460 battery cover water fill cap
510 12 volt source battery
520 12 volt source battery positive terminal
522 battery charger connector to positive terminal cable
523 12 volt source battery to positive battery output terminal cable
524 12 volt positive source battery source cable connector
530 12 volt source battery negative terminal
532 12 volt source battery to battery disconnect switch cable
533 battery disconnect switch to negative battery output terminal cable
534 12 volt negative source battery source cable connector
600 accessory concealing vehicle battery
610 accessory concealing vehicle battery housing
612 accessory concealing vehicle battery cover top panel
620 accessory concealing vehicle battery positive output terminal
628 battery positive terminal plug connector
630 accessory concealing vehicle battery negative output terminal
632 negative battery cable
633 battery negative terminal plug
637 battery terminal plug retention flange
638 battery negative terminal plug connector
639 battery terminal plug retention cavity potting material
640 battery disconnect assembly
642 battery disconnect assembly power source element
644 battery disconnect assembly power output element
650 battery charger connector
652 battery charger fuse
654 battery charger connector to positive terminal cable
655 first battery charger connector to transformer cable
656 second battery charger connector to transformer cable
660 battery cover water fill cap
662 battery disconnect switch access cap
664 battery charger connector access cap
666 battery charger fuse access cap
670 battery charger transformer
672 battery charger transformer positive power output cable
674 battery charger transformer negative power output cable
680 Global Positioning System (GPS) tracking device
682 Global Positioning System (GPS) positive power supply cable
684 Global Positioning System (GPS) negative power supply cable
710 12 volt source battery
720 12 volt source battery positive terminal 722 12 volt source battery to positive battery output terminal cable
730 12 volt source battery negative terminal
732 12 volt source battery to battery disconnect switch cable
733 battery disconnect switch to negative battery output terminal cable
800 accessory concealing vehicle battery
810 accessory concealing vehicle battery housing
812 accessory concealing vehicle battery cover top panel
820 accessory concealing vehicle battery positive output terminal
830 accessory concealing vehicle battery negative output terminal
833 battery negative terminal plug
837 battery terminal plug retention flange
838 battery negative terminal plug connector
839 battery terminal plug retention cavity potting material
840 battery disconnect assembly
842 battery disconnect assembly power source element
844 battery disconnect assembly power output element
850 battery charger connector
852 battery charger fuse
854 battery charger connector to positive terminal cable
855 battery charger connector to charging fuse cable
856 battery charger connector to negative terminal cable
860 battery cover water fill cap
862 battery disconnect switch access cap
864 battery charger connector access cap
866 battery charger fuse access cap
870 battery charger transformer
872 battery charger transformer positive power output cable
874 battery charger transformer negative power output cable
880 monitoring system
882 monitoring system positive input cable
884 monitoring system negative input cable
886 monitoring system output signal cable
888 monitoring system alert device
890 booster pack
892 booster pack to source battery positive terminal cable
894 booster pack to source battery negative terminal cable
910 12 volt source battery
920 12 volt source battery positive terminal
922 12 volt source battery to positive battery output terminal cable
926 12 volt source and second 12 volt source positive terminal coupling cable
930 12 volt source battery negative terminal
932 12 volt source battery to battery disconnect switch cable
933 battery disconnect switch to negative battery output terminal cable
936 12 volt source and second 12 volt source negative terminal coupling cable
1000 accessory concealing vehicle battery
1010 accessory concealing vehicle battery housing
1012 accessory concealing vehicle battery cover top panel
1020 accessory concealing vehicle battery positive output terminal
1030 accessory concealing vehicle battery negative output terminal
1033 battery negative terminal plug
1037 battery terminal plug retention flange
1038 battery negative terminal plug connector
1039 battery terminal plug retention cavity potting material
1040 battery disconnect assembly
1042 battery disconnect assembly power source element
1044 battery disconnect assembly power output element
1050 battery charger connector
1052 battery charger fuse
1054 battery charger connector to positive terminal cable
1055 battery charger connector to charging fuse cable
1056 battery charger connector to negative terminal cable
1060 battery cover water fill cap
1070 battery charger transformer
1072 battery charger transformer positive power output cable
1073 first battery charger transformer to booster pack charging cable
1074 battery charger transformer negative power output cable
1075 second battery charger transformer booster pack charging cable
1080 monitoring system
1082 monitoring system positive input cable
1084 monitoring system negative input cable
1086 monitoring system output signal cable
1088 monitoring system alert device
1090 booster pack
1092 booster pack to output battery positive terminal cable
1094 booster pack to output battery negative terminal cable
1096 booster pack diode
1110 12 volt source battery
1120 12 volt source battery positive terminal
1122 12 volt source battery to positive battery output terminal cable
1124 12 volt positive source battery source cable connector
1126 12 volt source and second 12 volt source positive terminal coupling cable
1130 12 volt source battery negative terminal
1132 12 volt source battery to battery disconnect switch cable
1133 battery disconnect switch to negative battery output terminal cable
1134 12 volt negative source battery source cable connector
1136 12 volt source and second 12 volt source negative terminal coupling cable

What is claimed is:

1. A vehicle battery assembly comprising:
a vehicle battery including a power storage configuration providing power to a pair of power supply terminals;
a battery concealing enclosure comprising four sidewalls and a top panel, the four sidewalls and top panel collectively define an interior volume sized and shaped to receive and conceal the vehicle battery;
a pair of connection terminals, each connection terminal being assembled to the battery concealing enclosure;
an electrical support component;
a first power supply terminal of the pair of power supply terminals and a first connection terminal of the pair of connection terminals in electrical communication with one another by a first electrically conductive element, wherein the first electrically conductive element enables physical and electrical separation between the vehicle battery and the first connection terminal;
a second power supply terminal of the pair of power supply terminals and a second connection terminal of the pair of connection terminals in electrical communication with one another by a second electrically conductive element, wherein the second electrically conductive element enables physical and electrical separation between the vehicle battery and the second connection terminal;
the electrical support component being in direct or indirect electrical communication with the pair of power supply terminals;

the vehicle battery and the electrical support component being concealed within the interior volume of the battery concealing enclosure,
wherein the battery concealing enclosure replicates an appearance of a different vehicle battery,
wherein the first electrically conductive element and the second electrically conductive element are flexible.

2. An vehicle battery assembly as recited in claim 1, the battery concealing enclosure further comprising:
a top panel that is movable respective to a main body, wherein, when the top panel is repositioned from an enclosed orientation to an access position, access is provided to the interior volume of the battery concealing enclosure.

3. An vehicle battery assembly as recited in claim 1, the battery concealing enclosure further comprising:
at least one battery cover water fill cap, wherein one or more of the at least one battery cover water fill cap provides access to an operational function of the vehicle battery assembly.

4. An vehicle battery assembly as recited in claim 1, the battery concealing enclosure further comprising:
at least one battery cover water fill cap, wherein one or more of the at least one battery cover water fill cap provides access to an operational function of the vehicle battery assembly, wherein the operational function of the vehicle battery assembly is at least one of:
a) access to a fuse,
b) a connection for a battery charger,
c) a connection to a battery charger, and
d) a battery disconnect switch.

5. An vehicle battery assembly as recited in claim 1, further comprising:
at least one of:
a) a battery condition monitoring circuit located within the battery concealing enclosure, the battery condition monitoring circuit being in electric communication with the vehicle battery,
b) a transformer located within the battery concealing enclosure, the transformer being in electric communication with a power input connector and the vehicle battery,
c) a booster pack located within the battery concealing enclosure, the booster pack being in electric communication with the vehicle battery,
d) a transformer and booster pack located within the battery concealing enclosure, the booster pack being in electric communication with the transformer and the vehicle battery, and
e) a Global Positioning System (GPS) located within the battery concealing enclosure, the Global Positioning System (GPS) being in electric communication with the vehicle battery.

6. An vehicle battery assembly as recited in claim 1, further comprising a battery disconnect switch electrically integrated between the first power supply terminal or second power supply terminal of the pair of power supply terminals of the vehicle battery and the like first connection terminal or second connection terminal of the pair of connection terminals of the battery concealing enclosure.

7. An vehicle battery assembly as recited in claim 1, further comprising a battery disconnect switch electrically integrated between the first power supply terminal or second power supply terminal of the pair of power supply terminals of the vehicle battery and the like first connection terminal or second connection terminal of the pair of connection terminals of the battery concealing enclosure, wherein the battery disconnect switch is concealed in a form of a battery cover water fill cap.

8. An vehicle battery assembly as recited in claim 1, further comprising one of a fuse or breaker switch electrically integrated between the first power supply terminal or second power supply terminal of the pair of power supply terminals of the automotive vehicle battery and the like first connection terminal or second connection terminal of the pair of connection terminals of the battery concealing enclosure.

9. An vehicle battery assembly as recited in claim 1, further comprising one of a fuse or breaker switch electrically integrated between the first power supply terminal or second power supply terminal of the pair of power supply terminals of the vehicle battery and the like first connection terminal or second connection terminal of the pair of connection terminals of the battery concealing enclosure, wherein the one of a fuse or breaker switch is accessible for service by way of a feature having a form of a battery cover water fill cap.

10. An vehicle battery assembly as recited in claim 1, further comprising a battery condition monitoring circuit located within the battery concealing enclosure, the battery condition monitoring circuit being in electric communication with the vehicle battery,
the battery condition monitoring circuit includes an output, wherein the output is at least one of:
a) an electrical signal,
b) a wireless signal,
c) an audible signal, and
d) a visual signal.

11. An vehicle battery assembly comprising:
a vehicle battery including a power storage configuration providing power to a pair of power supply terminals;
an electrical support component;
a battery concealing enclosure comprising four sidewalls and a top panel, the four sidewalls and top panel collectively define an interior volume sized and shaped to receive and conceal the vehicle battery the battery concealing enclosure includes an access section that is at least one of (a) detachably assembled to a battery concealing enclosure body, (b) assembled to a battery concealing enclosure body using at least one mechanical fastener, (c) hingeably assembled to the battery concealing enclosure body, (d) slideably assembled to the battery concealing enclosure body, and (e) pivotally assembled to the battery concealing enclosure body, wherein the access section enables access to the electronic support component;
a pair of connection terminals, each connection terminal being assembled to the battery concealing enclosure;
a first power supply terminal of the pair of power supply terminals and a first connection terminal of the pair of connection terminals in electrical communication with one another by a first electrically conductive element, wherein the first electrically conductive element enables physical and electrical separation between the vehicle battery and the first connection terminal;
a second power supply terminal of the pair of power supply terminals and a second connection terminal of the pair of connection terminals in electrical communication with one another by a second electrically conductive element, wherein the second electrically conductive element enables physical and electrical separation between the vehicle battery and the second connection terminal;

the electrical support component being in direct or indirect electrical communication with the pair of power supply terminals;

the vehicle battery and the electrical support component being concealed within the interior volume of the battery concealing enclosure, wherein the battery concealing enclosure replicates an appearance of a different vehicle battery, wherein the first electrically conductive element and the second electrically conductive element are flexible.

12. An vehicle battery assembly as recited in claim 11, wherein the access section is top panel that is movable respective to a main body, wherein, when the top panel is repositioned from an enclosed orientation to an access position, access is provided to the interior volume of the battery concealing enclosure.

13. An vehicle battery assembly as recited in claim 11, the battery concealing enclosure further comprising:

at least one battery cover water fill cap, wherein one or more of the at least one battery cover water fill cap provides access to an operational function of the vehicle battery assembly.

14. An vehicle battery assembly as recited in claim 11, the battery concealing enclosure further comprising:

at least one battery cover water fill cap, wherein one or more of the at least one battery cover water fill cap provides access to an operational function of the automotive vehicle battery assembly, wherein the operational function of the vehicle battery assembly is at least one of:

a) access to a fuse,
b) a connection for a battery charger,
c) a connection to a battery charger, and
d) a battery disconnect switch.

15. An vehicle battery assembly as recited in claim 11, further comprising:

at least one of:

a) a battery condition monitoring circuit located within the battery concealing enclosure, the battery condition monitoring circuit being in electric communication with the vehicle battery, b) a transformer located within the battery concealing enclosure, the transformer being in electric communication with a power input connector and the vehicle battery, c) a booster pack located within the battery concealing enclosure, the booster pack being in electric communication with the vehicle battery, d) a transformer and booster pack located within the battery concealing enclosure, the booster pack being in electric communication with the transformer and the vehicle battery, and e) a Global Positioning System (GPS) located within the battery concealing enclosure, the Global Positioning System (GPS) being in electric communication with the vehicle battery.

16. An vehicle battery assembly as recited in claim 11, further comprising a battery disconnect switch electrically integrated between the first power supply terminal or second power supply terminal of the pair of power supply terminals of the vehicle battery and the like first connection terminal or second connection terminal of the pair of connection terminals of the battery concealing enclosure.

17. An vehicle battery assembly as recited in claim 11, further comprising a battery disconnect switch electrically integrated between the first power supply terminal or second power supply terminal of the pair of power supply terminals of the vehicle battery and the like first connection terminal or second connection terminal of the pair of connection terminals of the battery concealing enclosure, wherein the battery disconnect switch is concealed in a form of a battery cover water fill cap.

18. An vehicle battery assembly as recited in claim 11, further comprising one of a fuse or breaker electrically integrated between the first power supply terminal or second power supply terminal of the pair of power supply terminals of the vehicle battery and the like first connection terminal or second connection terminal of the pair of connection terminals of the battery concealing enclosure.

19. An vehicle battery assembly as recited in claim 11, further comprising one of a fuse or breaker electrically integrated between the first power supply terminal or second power supply terminal of the pair of power supply terminals of the vehicle battery and the like first connection terminal or second connection terminal of the pair of connection terminals of the battery concealing enclosure, wherein the one of a fuse or breaker is accessible for service by way of a feature having a form of a battery cover water fill cap.

20. An vehicle battery assembly as recited in claim 11, further comprising a battery condition monitoring circuit located within the battery concealing enclosure, the battery condition monitoring circuit being in electric communication with the vehicle battery, the battery condition monitoring circuit includes an output, wherein the output is at least one of:

a) an electrical signal,
b) a wireless signal,
c) an audible signal, and
d) a visual signal.

* * * * *